No. 648,021. Patented Apr. 24, 1900.
J. W. D. CARSLAW.
TIRE.
(Application filed Nov. 22, 1899.)

(No Model.)

Witnesses
J B Weir
Ira D Perry

Inventor
John W D Carslaw
By Wales H Chamberlin
Atty

UNITED STATES PATENT OFFICE.

JOHN W. D. CARSLAW, OF CHICAGO, ILLINOIS, ASSIGNOR OF ONE-HALF TO JOHN C. SMITH, OF SAME PLACE.

TIRE.

SPECIFICATION forming part of Letters Patent No. 648,021, dated April 24, 1900.

Application filed November 22, 1899. Serial No. 737,912. (No model.)

*To all whom it may concern:*

Be it known that I, JOHN W. D. CARSLAW, a subject of the Queen of Great Britain, residing at Chicago, county of Cook, State of Illinois, have invented a certain new and useful Improvement in Tires; and I declare the following to be a full, clear, and exact description of the invention, such as will enable others skilled in the art to which it pertains to make and use the same, reference being had to the accompanying drawings, which form a part of this specification.

My invention has for its object the production of a fastening device for rubber tires on vehicles, &c.; and it consists in a combination of devices and appliances hereinafter described and claimed.

Figure 1:
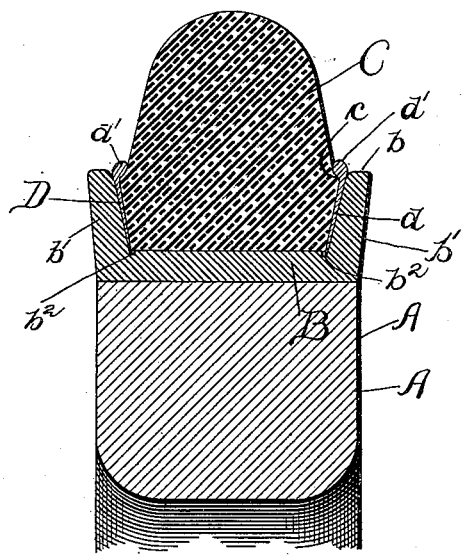
Figure 2:
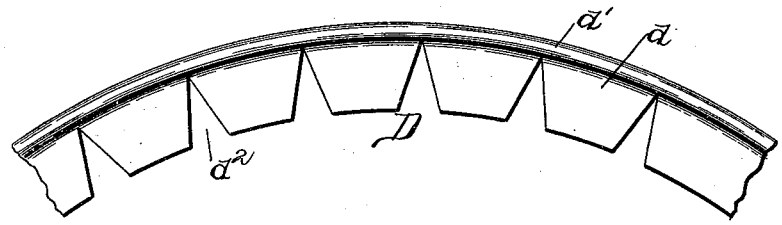
Figure 3:
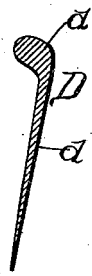

In the drawings, Figure 1 is a cross-section of a wheel-rim tire and fastening device. Fig. 2 is an enlarged side elevation of a section of the fastening-strip. Fig. 3 is a cross-section of the fastening device.

In carrying out the invention, A represents the rim of the wheel, B the channel-iron engaged to the rim in any suitable manner, and C the rubber tire.

D is a strip of metal (shown in cross-section in Fig. 3) having a web portion $d$ and a head or bead $d'$. On each side of the tire is a ridge or bead $c$, located when the tire is in place about on a line with the edge $b$ of the rim-channel, although this particular location is not essential. In engaging the tire to the rim the tire is first sprung into place, with the tire substantially filling the channel-iron. The strips D are then forced into place, with the web $d$ passing down between the tire and the flange $b'$ of the channel-iron, the lower edge preferably, although not necessarily, entering and resting in a groove $b^2$ in the channel-iron. This brings the head $d'$ to a bearing against the bead $c$ on the tire. The ends of the strip D are then fastened together in any suitable manner—as, for instance, by welding—and there being a strip for each side of the tire the latter is held firmly in place.

In order to give the strip D the desired curved shape, the web may be slitted, as at $d^2$, although this might not be necessary, as the curved shape might be given in the rolling. It is obvious that the specific shapes in cross-section of the head $d'$ and of the bead $c$ are immaterial, although I perfer about the form shown.

The material advantage in a fastening device such as mine over one that passes through the tire is that the rubber is not weakened, and consequently will not tear out. Again, by the provision of the web $d$ a broad surface of the fastening device is presented to the rubber, so that the fastening device will not cut into the rubber.

By extending the edge of the web into the groove $b^2$ the edge is prevented from cutting into the rubber.

What I claim is—

1. In combination a rubber tire and a wheel-rim having projecting flanges between which the tire is seated, said tire provided on each of its sides with a continuous ridge or shoulder, said tire held in place by two retaining-strips, one for each side of the tire, each of said strips provided with a ridge or projection adapted to be drawn down against the ridge or shoulder on the tire and thus compress the tire in its seat between the rim-flanges, the ends of each strip being fastened together after the strip has been drawn into place, substantially as described.

2. In combination, a rubber tire and a wheel-rim having two projecting flanges between which the tire is seated, a continuous shoulder or projection along each side of the tire, said shoulders when the tire is in place being adjacent to the edges of said projecting flanges and a fastening-strip for each side of the tire consisting of a strip of metal having a web portion adapted for insertion between the tire and the rim-flange, said strip provided along the edge of the web portion with a projection adapted to bear on the ridge or shoulder on the tire, and thus compress the tire in its seat between the rim-flanges, the ends of each strip being fastened together after the strip has been drawn into place, substantially as described.

3. In combination a rubber tire and a wheel-rim having two projecting flanges between which the tire is seated, each side of the tire being provided with a rounded seat or projection located when the tire is in place opposite the edge of the adjacent rim-flange and a retaining-strip for each side of the tire consisting of a web portion provided on its edge with a rounding projection adapted to fit the shoulder on the tire, said projection when the tire is in place being substantially opposite the edge of the rim-flange, and thus compress the tire in its seat between the rim-flanges the ends of each strip being fastened together after the strip has been drawn into place, substantially as described.

4. The combination with a rubber tire and the wheel-rim, of a continuous ridge or shoulder along each side of the tire, an outwardly-extending flange on each edge of the rim, between which the tire lies, and two fastening-strips one for each side of the tire, each strip extending entirely around the wheel and each consisting of a web portion inserted between the tire and rim-flange and a bead which engages the tire ridge, said rim provided also with a groove in which the edge of the web rests, substantially as described.

In testimony whereof I sign this specification in the presence of two witnesses.

JOHN W. D. CARSLAW.

Witnesses:
GERTRUDE HEIDELBERGER,
WALTER H. CHAMBERLIN.